(12) United States Patent
Tanaka et al.

(10) Patent No.: US 6,238,272 B1
(45) Date of Patent: May 29, 2001

(54) POLISHING COMPOUND AND A POLISHING METHOD FOR SILICON WAFER

(75) Inventors: Hiroaki Tanaka, Narashino; Akitoshi Yoshida; Yoshihisa Ogawa, both of Chiba, all of (JP)

(73) Assignee: SpeedFam-IPEC Co Ltd, Kanagawa-pref (JP)

( * ) Notice: Subject to any disclaimer, the term of this patent is extended or adjusted under 35 U.S.C. 154(b) by 0 days.

(21) Appl. No.: 09/389,605

(22) Filed: Sep. 3, 1999

(30) Foreign Application Priority Data

Sep. 4, 1998 (JP) .................................................. 10-251507

(51) Int. Cl.[7] ........................................................ B24B 1/00
(52) U.S. Cl. ................. 451/41; 451/36; 451/60; 451/287; 451/692; 451/693
(58) Field of Search .................................. 451/41, 36, 60, 451/287, 692, 693; 438/692, 693

(56) References Cited

U.S. PATENT DOCUMENTS

| | | | | |
|---|---|---|---|---|
| 5,968,239 | * | 10/1999 | Miyashita et al. | 106/3 |
| 6,099,604 | * | 8/2000 | Sandhu et al. | 51/307 |
| 6,106,728 | * | 8/2000 | Iida et al. | 210/743 |
| 6,110,832 | * | 8/2000 | Morgan, III et al. | 438/692 |
| 6,117,783 | * | 9/2000 | Small et al. | 438/693 |

* cited by examiner

Primary Examiner—Joseph J. Hail, III
Assistant Examiner—Shantese McDonald

(57) ABSTRACT

The present invention is a polishing compound comprising a colloidal solution of silicon oxide to which an alkaline component and an acid component are added in order to have a buffering action, wherein said alkali component is a quaternary ammonium whose carbon number per one molecular is smaller than 12, and said acid component is at least one selected from the group composed by carbonic acid, boric acid and silicic acid.

12 Claims, No Drawings

POLISHING COMPOUND AND A POLISHING METHOD FOR SILICON WAFER

BACKGROUND OF THE INVENTION

1. Field of the Invention

The present invention relates to a polishing compound used for the mirror finishing of the plate type work piece such as silicon wafer to which very precise flatness and parallelism are required. Further, the present invention relates to a method of polishing a silicon wafer using said polishing compound.

2. Description of the Prior Art

Recently, the required capacity for IC (integrated circuit), LSI (large scale integrated circuit) or VLSI (very large scale integrated circuit) is becoming bigger and bigger along with the tendency of remarkable progress of an electronic device. Therefore, the more precise surface flatness of semiconductor substrate are becoming necessary. Further, from the view point to improve the productivity, the development of a polishing compound which can perform higher removal rate and a polishing method by said polishing compound are desired. Furthermore, recently, since the products using epitaxial wafer are becoming the main product, width of circuit pattern to be written on the surface of wafer is becoming narrower. The contamination by metal on the surface of wafer, especially, by specific heavy metal such as copper, iron and nickel can be a ground to cause a serious defect at the later epitaxial process, therefore it is very important to reduce the contamination by heavy metal of silicon wafer and semiconductor device substrate at the processing and at the transportation.

In general, the polishing process to obtain a mirror finished surface on a flat plate type material such as glass, metal, semiconductor, ceramics, carbon material or silicon wafer which is the starting material of IC and LSI is carried out by following procedure. That is, a double sided or single sided polishing machine having an upper and a lower platen or one platen whose surface are covered by a thin layer of non-woven cloth is commonly used, and at the actual use, the work-piece is pressed against the platen which rotates by constant speed, providing the aqueous dispersion of polishing compound containing fine particles of colloidal silica. The processing method, conditions and apparatus to improve machining accuracy and removal rate and to obtain a mirror finished surface which does not have metal contamination and fine defects are continuously investigated. Further, to obtain more precise machining accuracy, the purity and stability of polishing compound must be controlled more seriously and other additional conditions must be also more seriously controlled.

As mentioned above, as a polishing compound for silicon wafer, the alkaline aqueous solution based polishing compound in which very fine colloidal silicon oxide fine particles (colloidal silica) are dispersed is generally used. Regarding the size of particle, the adequate size is selected and the precise classified particle which is ordinarily distributed is used. In a case of the silicon wafer polishing, the average center size of colloidal silica is from several nm to several hundred nm, and they are dispersed by stabilized condition in an alkaline aqueous solution. And, said dispersion is a an aqueous slurry in which fine particles of abrasive are dispersed by from several % to several ten %, and a dispersing agent, alkaline agent, organic solvents and other additives are added at need. The contained abrasive fine particles has an ordinary distribution curve having a center at the nominated size, and can contain coagulated particles.

The reason why the polishing compound is based on an alkaline aqueous solution, is that the polishing of silicon wafer is proceeded utilizing the chemical action of the alkaline to the silicon wafer. The thin corroded layer is formed by the corrosive action of alkaline and is removed by the mechanical rubbing action of fine particles of colloidal silica, which is so called mechano-chemical action. Therefore, since said action is largely effected by pH of the polishing compound, it is desirable to use the polishing compound in which buffering solution to stabilize pH is added. And as the buffering solution, a combination of strong base e.g. a hydroxide of alkali metal such as KOH or NaOH or an organic amine and acid, or a salt composed by weak acid and strong base are used.

Up to the present, many kinds of compound are proposed as a polishing compound of a silicon wafer. For instance, silica sol and silica gel are proposed as a polishing compound in U.S. Pat. No. 3,170,273. Further, the technique that the removing speed can be improved by adjusting pH of the colloidal solution within the range from 10.5 to 12.5 is disclosed in U.S. Pat. No. 3,328,141. In U.S. Pat. No. 4,169,337, the technique to add amines in a polishing compound is disclosed. In Japanese Patent Laid Open Publication 2-158684, a polishing compound composed by water, colloidal silica, water soluble polymer of bigger than 100,000 molecular weight and water soluble salts is disclosed. Further, in Japanese Patent Laid Open Publication 5-154760, a method for polishing by the use of a polishing compound containing 10–80 wt. % of piperazine which is a kind of water soluble amines to silica of silica gel or silica sol is disclosed. In Japanese Patent Laid Open Publication 9-193004, an aqueous polishing compound in which fumed silica of average primary diameter of particles is 5–30 nm and average diameter of coagulated particles is 30–100 nm whose pH is desirably adjusted within the range of 8–13 is disclosed. The main object of these disclosed methods is to obtain an excellent surface roughness and to improve the removal speed. However, from the view point not to cause a problem of heavy metal contamination, these mentioned methods are not sufficient. Therefore, these mentioned methods can not be used as a polishing compound for the processing of an epitaxial wafer or a semiconductor device which dislikes the heavy metal contamination.

As the origin which causes above mentioned heavy metal contamination, a polishing pad to be used, a piping, a working environment, an apparatus and tools for transportation, a working wear and an operator can be mentioned. However, since this operation is carried out in a high class clean room, and an apparatus and tools are the special contamination controlled type for clean room use, the main origin which causes said heavy metal contamination problem is the polishing compound. In the meanwhile, the removal of metal impurity contained in the starting material of the hydroxide of alkali metal and the salt of it with weak acid and refining is very difficult. Regarding the organic amine, since it forms easily a complex with heavy metal element, it is very difficult to be refined. That is, it is very difficult to remove heavy metal contamination from these compounds and to obtain highly refined products. The permitted quantity level of heavy metal contamination in an epitaxial wafer or in a semiconductor device is ppb (parts per billion) level. Meanwhile, since in the conventional type polishing compound, heavy metal is contained by ppm (parts per million) level as the contamination, it is possible to cause a heavy metal contamination problem on the surface of polished wafer.

The inventors of the present invention, have carried out an intensive study to overcome the above mentioned problems of conventional polishing compound for silicon wafer has, and have found that by use of the buffering solution composed by a specific type of quaternary ammonium and a specific type of weak acid a polishing compound slurry of low heavy metal contamination, with stabilized pH and higher removal rate can be obtained, and accomplished the present invention. That is, the object of this invention is to provide a polishing compound of low heavy metal contamination by which an excellent surface roughness and higher removal rate can be obtained. And another object of this invention is to provide a polishing method by use of said polishing compound.

BRIEF SUMMARY OF THE INVENTION

The above mentioned object can be accomplished by a polishing compound comprising a colloidal solution of silicon oxide to which an alkali component and an acid component are added in order to have a buffering action, wherein said alkali component is a quaternary ammonium whose carbon number per one molecule is smaller than 12, and said acid component is at least one selected from the group composed by carbonic acid, boric acid and silicic acid. The average diameter of silicon oxide as abrasive is 5 nm to 500 nm, the desirable concentration of silicon oxide is 1 to 30 wt. %, and more desirable concentration of it is 1 to 15 wt. %. Four substitution groups which forms a quaternary ammonium are desirably alkyl group such as methyl group, ethyl group, propyl group and butyl group or hydroxyethyl group. Further, pH of the polishing compound is desirably to be in the range of 8 to 11, and more desirably 9 to 11. The quaternary ammonium of this invention indicates total amount of quaternary ammonium ion dissociated in the polishing compound and quaternary ammonium ion absorbed over the surface of colloidal silica.

DETAILED DESCRIPTION OF THE INVENTION

The polishing machine used in this invention is a machine which has a rotatable platen whose surface is stuck with a polishing pad, and the polishing is carried out by setting a silicon wafer work piece on the platen and rotating said platen with the constant supply of said polishing compound. In this invention, the term of silicon wafer indicates a bare silicon wafer, an epitaxial wafer and a semiconductor device wafer.

The polishing compound used in this invention is a dispersion of colloidal type of silicon oxide as the abrasive, and the buffering agent which compose the dispersion is to maintain pH of the dispersion between 8.7 and 11.0 range. The important point of this invention is that the buffering agent is composed by alkali component which uses quaternary ammonium whose carbon number per one molecule is smaller than 12 and acid component which uses at least one selected from the group composed by carbonic acid, boric acid and silicic acid. Since the quaternary ammonium contained as the alkali component does not form complex with heavy metal element, it can be easily refined. Especially, when the total number of carbons of 4 substitution groups which forms a quaternary ammonium is smaller than 12, said tendency becomes more remarkable, further, it is desirable that said each substitution group is an alkyl group such as methyl group, ethyl group, propyl group and butyl group or a hydroxyethyl group. Thus, the heavy metal contamination contained as an impurity can be reduced smaller than 20 ppb level. Concretely, tetramethylammonium, tetraethylammonium, tetrapropyl- ammonium and tetrabutylammonium can be mentioned.

As the acid component which forms stabilized buffering solution with above mentioned quaternary ammonium, inorganic acid such as carbonic acid, boric acid, silicic acid and phosphoric acid can be used. For the purpose to reduce the heavy metal contamination remarkably, it is desirable to use the inorganic weak acid such as carbonic acid, boric acid and silicic acid.

As the buffering solution of this invention, the combination indicated by following A, B, C and the mixture of them can be used.

A: Combination of quaternary ammonium ion [$NR_4^+$: R represents methyl group, ethyl group, propyl group, butyl group or hydroxyethyl group] with undissociated boric acid [$B(OH)_3$] and boric acid ion [$B(OH)_4^{31}$]

B: Combination of quaternary ammonium ion [$NR_{4+}$] with carbonic acid ion [$CO_3^{2-}$] and/or hydrogen carbonate ion [$HCO_3^-$]

C: Combination of quaternary ammonium ion [$NR_4^+$] with monohydric silicic acid ion [$HSiO_2(OH)_2^{31}$] and/or dihydric silicic acid ion [$SiO_2(OH)_2^{2-}$]

As a silicon oxide abrasive contained in the polishing compound used in this invention, the silicon oxide of 5–50 nm average diameter can be used. When the average diameter is finer than 5 nm, the sufficient polishing force can not be expected, and when it is coarser than 50 nm, the sufficient surface roughness can not be obtained. The desirable concentration of silicon oxide abrasive at actual use is 1–30 wt. %, more desirably 1–15 wt. %. When concentration is smaller than 1 wt. %, the removal rate relatively drops to lower level, and when the concentration becomes higher, the removal rate increases relatively. However, at 15 wt. % the removal rate reaches to a saturated peak value. And the chips generated by polishing remain in the solution because of it's recycling use and increases the concentration of the solution. When the initial abrasive concentration is bigger than 30 wt. %, the further increase of the abrasive concentration has no benefit, and the concentration of recycled polishing compound solution becomes higher and also the viscosity of the solution becomes higher. Further, the condition of slurry becomes unstable.

The fine particles of silicon oxide used in this invention can be prepared by several kinds of methods, such as a water glass method, an ethylsilicate method or an alkoxide method but are not intended to be limited, however, especially it is desirable to use the colloidal silica prepared by alkoxide method or the fumed silica prepared by acid hydrogen flame method. The silicon oxide fine particles prepared by these methods can be refined to the level whose contamination of nickel, copper and iron is very low, and is suited as the polishing compound of this invention.

The desirable pH of the polishing compound used in this invention is within the range of 8–11, and more desirably 9–11. When pH value becomes closer to neutral, removal rate is deteriorated and when it become lower than 8, the removal rate is remarkably deteriorated and out of the practical use. And when pH becomes bigger than 11, the stability of the polishing component deteriorates. And when pH of it becomes bigger than 11, since silica sol starts to coagulate, the stability of the polishing compound is deteriorated. The surface roughness of polished surface becomes coarser, further the problem of abnormal scratches occurs, and it becomes very difficult to obtain a desired constant removal rate.

When the electric conductivity at 25° C. per 1 wt. % of silicon oxide of the polishing compound used in this invention is bigger than 20 ms/m (micro Siemens /meter), the removal rate can be improved with out hurting surface roughness. To improve the electric conductivity, it is possible to make higher the concentration of alkali component and acid component, or to add salts. The kinds of salt to be added is selected by the combination of acid and base and is not restricted, however it is desirable to use the refined one whose heavy metal contamination is controlled to lower level. A surface active detergent, dispersing agent and anti sedimentation agent can be added to improve the polishing compound of this invention or to improve the surface quality of the work piece. The polishing compound of this invention is an aqueous solution, however it is possible to a water soluble organic solvent. The polishing compound of this invention can be prepared by mixing colloidal silica and additives at the actual use.

THE DETAIL DESCRIPTION OF THE EXAMPLE

The present invention will be understood more readily with reference to Examples and the Comparative Examples, however these Examples are only intended to illustrate the invention and not be construed to limit the scope of the invention.

Preparation of the Polishing Compound

The polishing compound used in the Example and Comparative Example is prepared by following procedure. High purity fumed silica is used as the fine particle of silicon oxide, dispersed in DI water and slurry is prepared. The average diameter of the silicon oxide particles is 180 nm. Necessary weight of the slurry is picked up, add 1000g of DI water, then buffering solution and salts are added by constant stirring and adjusted to 3000g by DI water. Thus the polishing compound is prepared.

Preparation of the Buffering Solution

The pH buffering solution composed by quaternary ammonium and carbonic acid, boric acid and silicic acid are prepared by following procedure.

(1) Buffering solution by quaternary ammonium and carbonic acid

Carbonic acid gas is introduced into 10 wt. % of aqueous solution of quaternary ammonium. After introduction of carbonic acid gas, the concentration of carbonic acid gas is measured by titration, then adjusted by adding quaternary ammonium hydroxide to obtain the aimed buffering solution.

(2) Buffering solution by quaternary ammonium and boric acid

Prepared by adding boric acid to 10 wt. % of aqueous solution of quaternary ammonium. The boric acid is previously refined by an ion exchanging method.

(3) Buffering solution by quaternary ammonium and silicic acid

Prepared by adding ethyl silicate and hydrolyzing the added ethyl silicate to 10 wt. % of aqueous solution of quaternary ammonium by constant stirring.

Polishing Condition

Polishing is carried out on silicon wafer by following condition and a mirror finished silicon wafer is obtained.
Polishing machine: SH-24 type, product of Speedfam. Ipec Co., Ltd.,
Rotating speed of platen: 70 r.p.m.
Rotating speed of pressure plate : 50 r.p.m.
Polishing pad: SUBA 400 (product of Rodel Nitta)
Pressure: 400 g/cm$^2$
Flow rate of polishing compound: 80 L/min
Polishing time: 10 min
Specimen for polishing: 4 inch size as prepolished silicon wafer

Measurement and Evaluation Method

The removal rate is measured by weighing the weight before and after polishing.

pH of polishing compound is measured by pH meter. Before the measurement, pH electrode is calibrated by the standard pH solution of pH 6.86 and pH 9.18.

Electric conductivity is measured by an electric conductivity meter.

Hase and bit of the processed surface are inspected by naked eyes of inspector under the concentrated lamp.

The impurity contained in the polishing compound is measured by ICP emission spectrochemical analyser.

Instruction of Symbolic Marks

In Tables, each symbolic marks of Examples and Comparative Examples indicates chemical compounds as follows.
TMAOH: tetramethyl ammonium hydroxide
TMAHCO$_3$: tetramethyl ammonium hydrogen-carbonate
TMABr: tetramethyl ammonium bromide
TMA/SiO$_2$: aqueous solution of TMAOH. 1.2(SiO$_2$)
TEAOH: tetraethyl ammonium hydroxide
TEAHCO3: tetraethyl ammonium hydrogen-carbonate
TPAOH : tetrapropyl ammonium hydroxide
TPAHCO$_3$: tetrapropyl ammonium hydrogen-carbonate
DEA: diethanol amine
MEA: monoethanol amine
TBAOH : tetrabutyl ammonium hydroxide
TBAHCO$_3$: tetrabutyl ammonium hydrogen-carbonate

Example 1, Comparative Example 1

The buffering solution and salts shown in Table 1 are added and polishing compounds are prepared. Experiment No.1 and 2 are the Examples of this invention, and experiment No.3 and 4 are the Comparative Examples of this invention. The polishing compound is used by circulation and polished by afore mentioned experimental conditions, and the removal rate, pH change and surface quality of the polished wafer are measured and compared. The obtained results are summarized in Table 2.

TABLE 1

| | | Example 1 | | Comparative Example 1 | |
|---|---|---|---|---|---|
| experiment No. | | 1 | 2 | 3 | 4 |
| additive/ quantity (mol/kg-SiO$_2$) | | TMAOH/ 0.288 TMAHCO$_3$/ 0.302 | TMAOH/ 0.432 TMAHCO$_3$/ 0.453 | diluted solu. of polishing compound on market | TMAOH/ 0.005 |
| pH | | 10.0 | 10.3 | 10.7 | 10.4 |
| conc. of silica (wt. %) | | 10.0 | 10.0 | 10.0 | 10.0 |
| electric conductivity (*1) | | 47 | 71 | 9 | 17 |
| impurity (ppb) | Cu | 10> | 10> | 10> | 10> |
| | Ni | 20> | 20> | 150 | 20> |
| | Fe | 50 | 60 | 1800 | 50 |

*1: ms/m/1%-SiO$_2$

TABLE 2

| | | Example 1 | | | Comparative Example 1 | | |
|---|---|---|---|---|---|---|---|
| | | experiment No. | | | | | |
| | | 1 | | 2 | | 3 | | 4 | |
| | | rate (*2) | pH | rate (*2) | pH | rate (*2) | pH | rate (*2) | pH |
| recycling No. of polishing compound | 0 | 0.57 | 10.5 | 0.60 | 10.4 | 0.44 | 10.4 | 0.46 | 10.6 |
| | 1 | 0.57 | 10.4 | 0.60 | 10.4 | 0.44 | 10.2 | 0.46 | 10.6 |
| | 2 | 0.56 | 10.4 | 0.60 | 10.4 | 0.43 | 10.1 | 0.45 | 10.2 |
| | 3 | 0.56 | 10.4 | 0.59 | 10.3 | 0.43 | 10.0 | 0.45 | 10.0 |
| | 4 | 0.56 | 10.3 | 0.60 | 10.3 | 0.43 | 9.9 | 0.44 | 9.9 |
| | 5 | 0.56 | 10.3 | 0.59 | 10.3 | 0.42 | 9.8 | 0.44 | 9.8 |
| | 6 | 0.56 | 10.3 | 0.59 | 10.3 | 0.42 | 9.7 | 0.44 | 9.7 |
| | 7 | 0.56 | 10.3 | 0.59 | 10.3 | 0.41 | 9.6 | 0.43 | 9.7 |
| | 8 | 0.56 | 10.3 | 0.58 | 10.3 | 0.41 | 9.6 | 0.43 | 9.5 |
| | 9 | 0.56 | 10.3 | 0.58 | 10.3 | 0.40 | 9.5 | 0.42 | 9.4 |

*2: removal rate (μm/min)

Experiment No.1 and 2 are the Examples of the high purity polishing compound, and the removal rate is not affected by the circulation use of the polishing compound. In comparison with Comparative Examples 1 and 2, the change of pH is smaller. The amount of iron contained as an impurity in Comparative Example 1 which is the diluted product of the polishing compound on the market is considerably big.

Example 2, Comparative Example 2

The buffering solution and salts shown in Table 3, 4 and 5 are added and polishing compounds are prepared. Experiment No.5–16 are the Examples of this invention which uses fumed silica as the fine particles of silicon oxide, and Experiment No.17–24 are the Comparative Examples in which kinds of additive and kind of silicon oxide are altered. The polishing compound is circulated and polishing tests are carried out according to afore mentioned experimental conditions. The removal rate, pH change and surface quality of the polished wafer are measured and compared. The obtained results are summarized in Table 3, 4 and 5.

TABLE 3

| experiment No. | | 5 | 6 | 7 | 8 | 9 | 10 |
|---|---|---|---|---|---|---|---|
| additives and quantity (mol/kg-$SiO_2$) | TMAOH | 0.144 | 0.288 | 0.288 | 0.288 | 0.432 | 0.144 |
| | TMAHCO$_3$ | 0.158 | 0.302 | 0.302 | 0.302 | 0.453 | 0.158 |
| | $K_2SO_4$ | | | | | | 0.144 |
| | TMABr | | | | | | |
| | TMA/$SiO_2$ | | | | | | |
| | TEAOH | | | | | | |
| | TEAHCO$_3$ | | | | | | |
| | TPAOH | | | | | | |
| | TPAHCO$_3$ | | | | | | |
| | $H_3BO_3$ | | | | | | |
| conc. of $SiO_2$ (wt. %) | | 5.0 | 5.0 | 7.5 | 10.0 | 10.0 | 10.0 |
| pH | | 9.5 | 10.0 | 10.0 | 10.0 | 10.3 | 9.5 |
| electric conductivity (*1) | | 22 | 48 | 46 | 46 | 71 | 58 |
| removal rate (μm/min) | | 0.44 | 0.54 | 0.56 | 0.57 | 0.60 | 0.48 |
| surface quality | | good | good | good | good | good | good |
| impurity (ppb) | Cu | 10> | 10> | 10> | 10> | 10> | 10> |
| | Ni | 20> | 20> | 20> | 20> | 20> | 20> |
| | Fe | 50 | 50 | 60 | 50 | 70 | 50 |

TABLE 4

| experiment No. | | 11 | 12 | 13 | 14 | 15 | 16 |
|---|---|---|---|---|---|---|---|
| additives and quantity (mol/kg-$SiO_2$) | TMAOH | 0.144 | 0.288 | 0.144 | | | 0.288 |
| | TMAHCO$_3$ | 0.158 | | 0.158 | | | 0.302 |
| | $K_2SO_4$ | | | | | | |
| | TMABr | 0.288 | | | | | |
| | TMA/$SiO_2$ | | | | 0.072 | | |
| | TEAOH | | | | | 0.288 | |
| | TEAHCO$_3$ | | | | | 0.302 | |
| | TPAOH | | | | | | 0.288 |
| | TPAHCO$_3$ | | | | | | 0.302 |
| | $H_3BO_3$ | | 0.327 | | | | |
| conc. of $SiO_2$ (wt. %) | | 5.0 | 5.0 | 5.0 | 5.0 | 5.0 | 5.0 (*3) |
| pH | | 9.5 | 10.1 | 10.4 | 10.0 | 10.0 | 10.0 |
| electric conductivity (*1) | | 57 | 21 | 32 | 46 | 45 | 48 |
| removal rate (μm/min) | | 0.50 | 0.42 | 0.48 | 0.52 | 0.49 | 0.51 |
| surface quality | | good | good | good | good | good | good |
| impurity (ppb) | Cu | 10> | 10> | 10> | 10> | 10> | 10> |
| | Ni | 20> | 20> | 20> | 20> | 20> | 20> |
| | Fe | 50 | 50 | 70 | 50 | 50 | 20> |

*3: high purity silica sol prepared by hydrolysis of silicate ester, average particle size is 72 nm.

TABLE 5

| experiment No. | | 17 | 18 | 19 | 20 | 21 | 22 | 23 | 24 |
|---|---|---|---|---|---|---|---|---|---|
| additives and quantity (mol/kg-$SiO_2$) | DEA | 0.24 | | 0.24 | | | | (*5) | |
| | MEA | | 0.24 | | 0.24 | | | | |
| | $K_2SO_4$ | | | | | 0.144 | 0.144 | | |
| | TBAOH | | | | | | | | 0.288 |
| | TBAHCO$_3$ | | | | | | | | 0.302 |
| kind of $SiO_2$ (*4) | | f.s | w.g | w.g | w.g | f.s. | w.g | w.g | f.s. |
| conc. of $SiO_2$ (wt. %) | | 5.0 | 5.0 | 5.0 | 5.0 | 5.0 | 5.0 | 5.0 | 5.0 |
| pH | | 7.1 | 8.4 | 10.2 | 10.4 | 7.0 | 9.7 | 10.4 | 10.0 |
| electric conductivity (*1) | | 2 | 7 | 20 | 22 | 37 | 48 | 10 | 45 |
| removal rate (μm/min) | | 0.12 | 0.15 | 0.36 | 0.37 | 0.23 | 0.20 | 0.34 | 0.28 |
| surface quality | | good | good | good | good | good | good | good | good |

TABLE 5-continued

| experiment No. | | 17 | 18 | 19 | 20 | 21 | 22 | 23 | 24 |
|---|---|---|---|---|---|---|---|---|---|
| impurity | Cu | 10> | 10> | 10> | 10> | 10> | 10> | 10> | 10> |
| (ppb) | Ni | 20> | 70> | 120 | 150 | 20> | 200 | 130 | 20> |
| | Fe | 50 | 1200 | 2000 | 2000 | 70 | 3200 | 1700 | 50 |

*4: f.s. means fumed silica, and w.g. means silicon oxide prepared by water glass method
*5: diluted solution of polishing compound on market The Experiment No.5–16 are the Example of high purity polishing compound, which show good removal rate and good surface quality, further, the content of heavy metal is small. The Experiment No.17 and 21 are the Comparative Example of lower pH, whose removal rate is not sufficient. Further, since the polishing compound of Experiment No.18, 19, 20, 22 and 23 contains large amount of heavy metal, especially iron impurity, they have a possibility to cause a serious heavy metal contamination.

As clearly understood by mentioned illustration, it becomes possible to accomplish constantly high removal rate polishing by the polishing compound of this invention without spoiling the surface quality of polished silicon wafer or semi-conductor device. Further, the problem of heavy metal contamination which is very difficult to solve by the conventional type polishing compound is solved and the contamination level is remarkable reduced. Therefore, for the polishing of an epitaxial wafer which remarkably dislike the heavy metal contamination, the polishing compound of this invention can be reliably used. The polishing compound of this invention solve the problem of epitaxial wafer whose amount of production will be extremely increased in near future, and make it possible to improve the productivity of epitaxial wafer to a commercial production level.

The polishing compound of this invention can be used not only for a conventional single sided or a double sided polishing machine which has rotatable platen, but also for an edge polishing machine for a silicon wafer. For example, SH-24 type single sided polishing machine, FAM-59SPAW type double sided polishing machine and EP-2001V type polishing machine (all are the products of Speedfam. Ipec Co., Ltd.). By use of the polishing compound of this invention, the constant and high removal rate polishing of a silicon wafer or a substrate of semiconductor device become possible without spoiling the surface quality.

What is claimed is:

1. A polishing compound comprising a colloidal solution of silicon oxide, and a buffering effective amount of an alkali component and an acid component, wherein, said alkali component is a quaternary ammonium compound having in total 12 or fewer carbon atoms and wherein the four substitutents on the nitrogen atom are selected from the group consisting of methyl, ethyl, propyl, butyl and hydroxethyl groups, and the acid component is at least one acid selected from the group consisting of carbonic acid, boric acid and silicic acid.

2. The polishing compound of claim 1, wherein said silicon oxide has an average particle diameter of from 5 nm to 500 nm, and comprise from 1 wt % to 30 wt % of the polishing compound.

3. The polishing compound of claim 2, wherein said silicon oxide comprises from 1 wt % to 15 wt % of the polishing composition.

4. The polishing compound of claim 1 having a pH in the range of from 8 to 11.

5. The polishing compound of claim 1 having a pH in the range of from 9 to 11.

6. The polishing compound of claim 1 wherein the quaternary ammonium compound is tetramethyl ammonium, tetraethyl ammonium, tetrapropyl ammonium or tetrabutyl ammonium.

7. The polishing compound of claim 1 having a heavy metal content of less than 20 parts per billion.

8. The polishing compound of claim 1 wherein the acid comprises boric acid.

9. The polishing compound of claim 1 wherein the acid comprises carbonic acid.

10. The polishing compound of claim 1 wherein the acid comprises silicic acid.

11. A polishing compound comprising a colloidal solution of silicon oxide, and a buffering effective amount of a quaternary ammonium compound having in total 12 or fewer carbon atoms and an acid component selected from the group consisting of carbonic acid, boric acid and silicic acid; and wherein the electrical conductivity of said polishing compound at 25° C. per 1 wt % of silicon oxide is greater than 20 ms/m.

12. The polishing compound of claim 11 wherein the four substitutents on the nitrogen atom of the quaternary ammonium compound are selected from the group consisting of methyl, ethyl, propyl, butyl and hydroxethyl groups.

* * * * *